US011908419B2

(12) United States Patent
Yang

(10) Patent No.: US 11,908,419 B2
(45) Date of Patent: Feb. 20, 2024

(54) GATE DRIVER WITHOUT USING CARRY SIGNAL AND DISPLAY DEVICE COMPRISING THE SAME

(71) Applicant: LG Display Co., Ltd., Seoul (KR)

(72) Inventor: JunHyeok Yang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/966,489

(22) Filed: Oct. 14, 2022

(65) Prior Publication Data

US 2023/0169925 A1 Jun. 1, 2023

(30) Foreign Application Priority Data

Nov. 30, 2021 (KR) ........................ 10-2021-0168716

(51) Int. Cl.
*G09G 3/3266* (2016.01)

(52) U.S. Cl.
CPC ... *G09G 3/3266* (2013.01); *G09G 2310/0291* (2013.01); *G09G 2310/08* (2013.01)

(58) Field of Classification Search
None
See application file for complete search history.

(56) References Cited

U.S. PATENT DOCUMENTS

2007/0008268 A1* 1/2007 Park ........................ G11C 19/28 345/92
2007/0052653 A1* 3/2007 Shin ..................... G09G 3/3266 345/98
2019/0057638 A1* 2/2019 Kim ........................ G11C 19/28

* cited by examiner

*Primary Examiner* — Amr A Awad
*Assistant Examiner* — Donna V Bocar
(74) *Attorney, Agent, or Firm* — Birch, Stewart Kolasch & Birch, LLP

(57) ABSTRACT

A gate driver and a display device comprising the same are discussed. The gate driver can comprise a plurality of stages for individually driving a plurality of gate lines by a combination of a plurality of group signals, a plurality of block signals, and a plurality of clock signals. Each of the plurality of stages driven independently can include an output buffer including a pull-up transistor configured to generate and output a gate-on level of a scan signal under the control of a first node, and a pull-down transistor configured to generate and output a gate-off level of the scan signal under the control of a second node. Each stage can further include a first controller configured to control the first node, and a second controller configured to control the second node to be opposite to the operation of the first node.

20 Claims, 7 Drawing Sheets

GATE DRIVER WITHOUT USING CARRY SIGNAL AND DISPLAY DEVICE COMPRISING THE SAME

CROSS-REFERENCE TO RELATED APPLICATION

This application claims the priority benefit of the Korean Patent Application No. 10-2021-0168716 filed on Nov. 30, 2021 in the Republic of Korea, the entire contents of this application being hereby expressly incorporated by reference into the present application.

BACKGROUND

Technical Field

The present disclosure relates to a gate driver for stably driving gate lines without using a carry signal, and a display device having the gate driver.

Description of the Related Art

A display device includes a panel for displaying an image through a pixel matrix, and a driving circuit for driving the panel. A gate driver of the driving circuit drives a gate line connected to a thin film transistor TFT of each pixel, and a data driver drives a data line connected to the thin film transistor TFT.

The gate driver includes a plurality of stages individually driving the gate lines, and the plurality of stages are dependently connected to each other. Each of the stages outputs a scan signal to each gate line and outputs a carry signal for controlling the operation of the other stage. Each stage can be operated by receiving the carry signal output from another stage as a set signal and a reset signal.

However, if the carry signal is not outputted from any one of the plurality of stages due to defects of any one stage, it is possible that the stages which are connected organically are not operated to output the scan signal, so that an image is not properly displayed on the panel.

For the stable output of the scan signal and the carry signal, the gate driver needs a plurality of thin film transistors TFT for an input portion, a reset portion, an inverter, an output buffer, and a stabilization portion in each stage. As a result, the gate driver can increase in size, and thus, a bezel area can increase in size.

The content and issues of the above-described background art are provided as they were recognized by the inventor(s) of the present disclosure to devise the present disclosure or are technical information acquired by a process of devising the present disclosure, but may not be regarded as the known art disclosed to the general public before the present disclosure is disclosed.

SUMMARY OF THE DISCLOSURE

The present disclosure has been made in view of the above issues and other limitations associated with the related art, and one or more aspects of the present disclosure provides a gate driver capable of stably driving gate lines without using a carry signal, and a display device having the gate driver.

One or more aspects of the present disclosure provides a gate driver capable of reducing a size of a bezel area by decreasing the number of thin film transistors in each stage, and a display device having the gate driver.

In addition to the technical benefits of the present disclosure as mentioned above, additional benefits and features of the present disclosure will be clearly understood by those skilled in the art from the following description of the present disclosure.

In accordance with an aspect of the present disclosure, a gate driver can comprise a plurality of stages configured to individually drive a plurality of gate lines by a combination of a plurality of group signals, a plurality of block signals, and a plurality of clock signals, wherein each of the plurality of stages driven independently includes an output buffer including a pull-up transistor configured to generate and output a gate-on level of the scan signal under the control of a first node, and a pull-down transistor configured to generate and output a gate-off level of the scan signal under the control of a second node, a first controller configured to control the first node by the combination of the group signal supplied through a group line among the plurality of group signals, the block signal supplied through a block line among the plurality of block signals, and the clock signal supplied through a clock line among the plurality of clock signals, and a second controller configured to control the second node to be opposite to the operation of the first node by the combination of the group signal, the block signal, and the clock signal.

In accordance with another aspect of the present disclosure, a display device can include the above gate driver embedded in a display panel.

In accordance with another aspect of the present disclosure, a display device can comprise a display panel, and a gate driver embedded in the display panel, wherein the gate driver comprises: a plurality of stages configured to individually drive a plurality of gate lines by a combination of a plurality of group signals, a plurality of block signals, and a plurality of clock signals, wherein each of the plurality of stages driven independently includes: an output buffer including a pull-up transistor configured to generate and output a gate-on level of the scan signal under the control of a first node, and a pull-down transistor configured to generate and output a gate-off level of the scan signal under the control of a second node, a first controller configured to control the first node by the combination of the group signal supplied through a group line among the plurality of group signals, the block signal supplied through a block line among the plurality of block signals, and the clock signal supplied through a clock line among the plurality of clock signals, and a second controller configured to control the second node to be opposite to the operation of the first node by the combination of the group signal, the block signal, and the clock signal.

In addition to the features of the present disclosure as mentioned above, additional technical benefits and features of the present disclosure will be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION OF THE EMBODIMENTS

Figure 1:
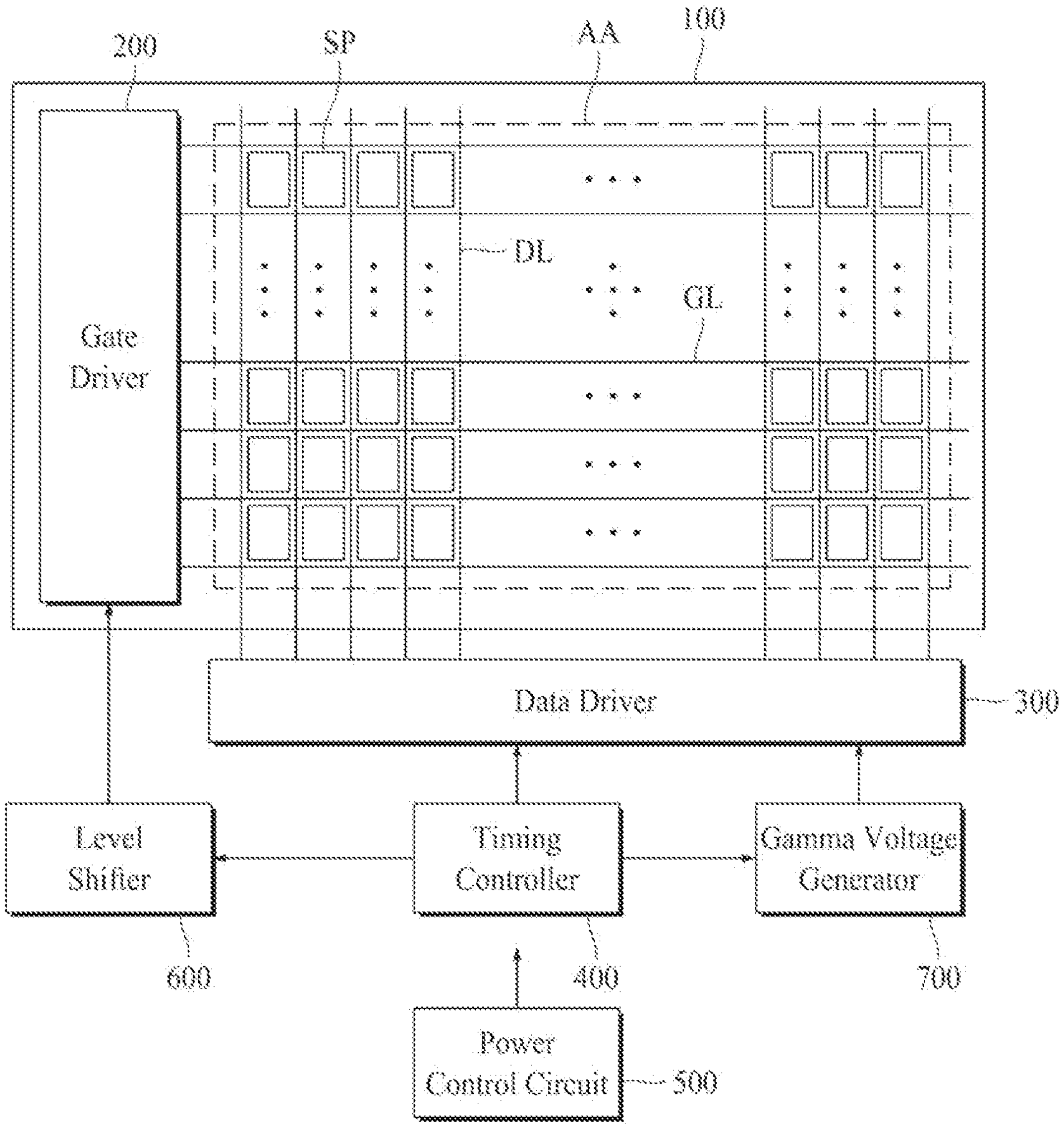
FIG. 1 is a system configuration of a display device according to one embodiment of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise', 'have', and 'include' described in the present specification are used, another part can be added unless 'only' is used. The terms of a singular form can include plural forms unless referred to the contrary.

In construing an element, the element is construed as including an error range although there is no explicit description.

In describing a position relationship, for example, when a position relation between two parts is described as "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case which is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another, and may not define any order. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., can be used. These terms are intended to identify the corresponding elements from the other elements, and basis, order, or number of the corresponding elements should not be limited by these terms. As for the expression that an element or a layer is "connected," "coupled," or "adhered" to another element or layer, the element or layer can be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various aspects of the present disclosure can be partially or overall coupled to or combined with each other, and can be variously inter-operated with each other and driven technically as those skilled in the art can sufficiently understand. The aspects of the present disclosure can be carried out independently from each other, or can be carried out together in co-dependent relationship.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display device according to all embodiments of the present disclosure are operatively coupled and configured.

Figure 2:
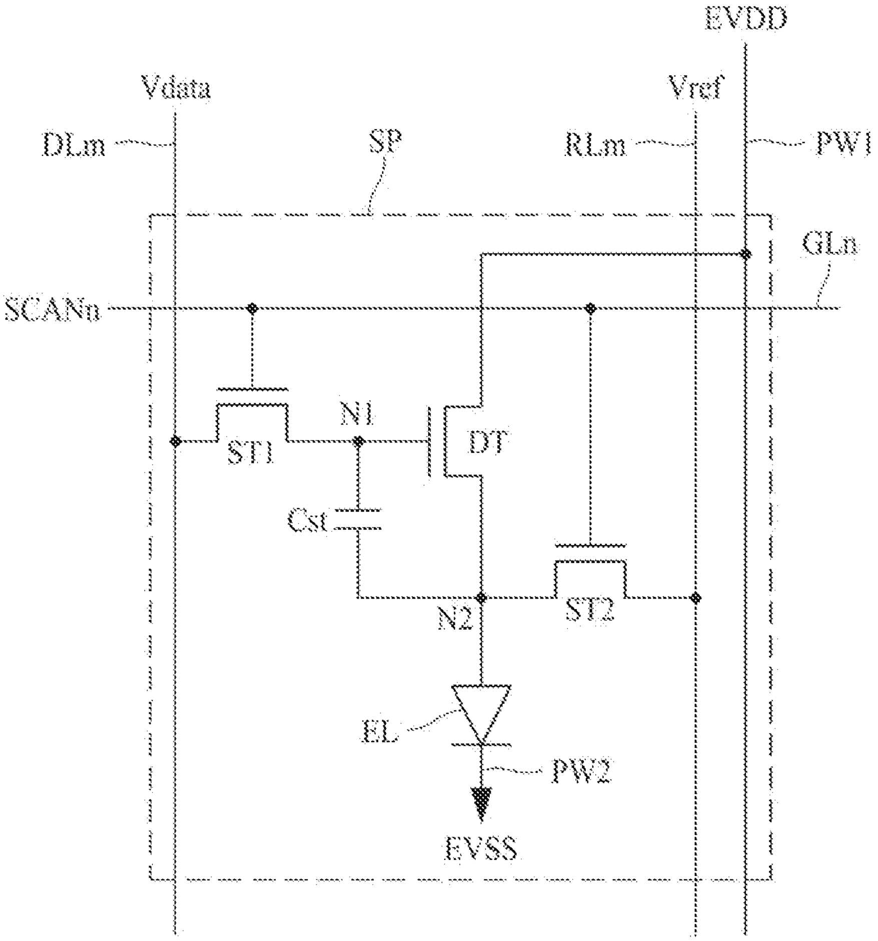
FIG. 2 is an equivalent circuit diagram of a subpixel according to one embodiment of the present disclosure.
Figure 3:
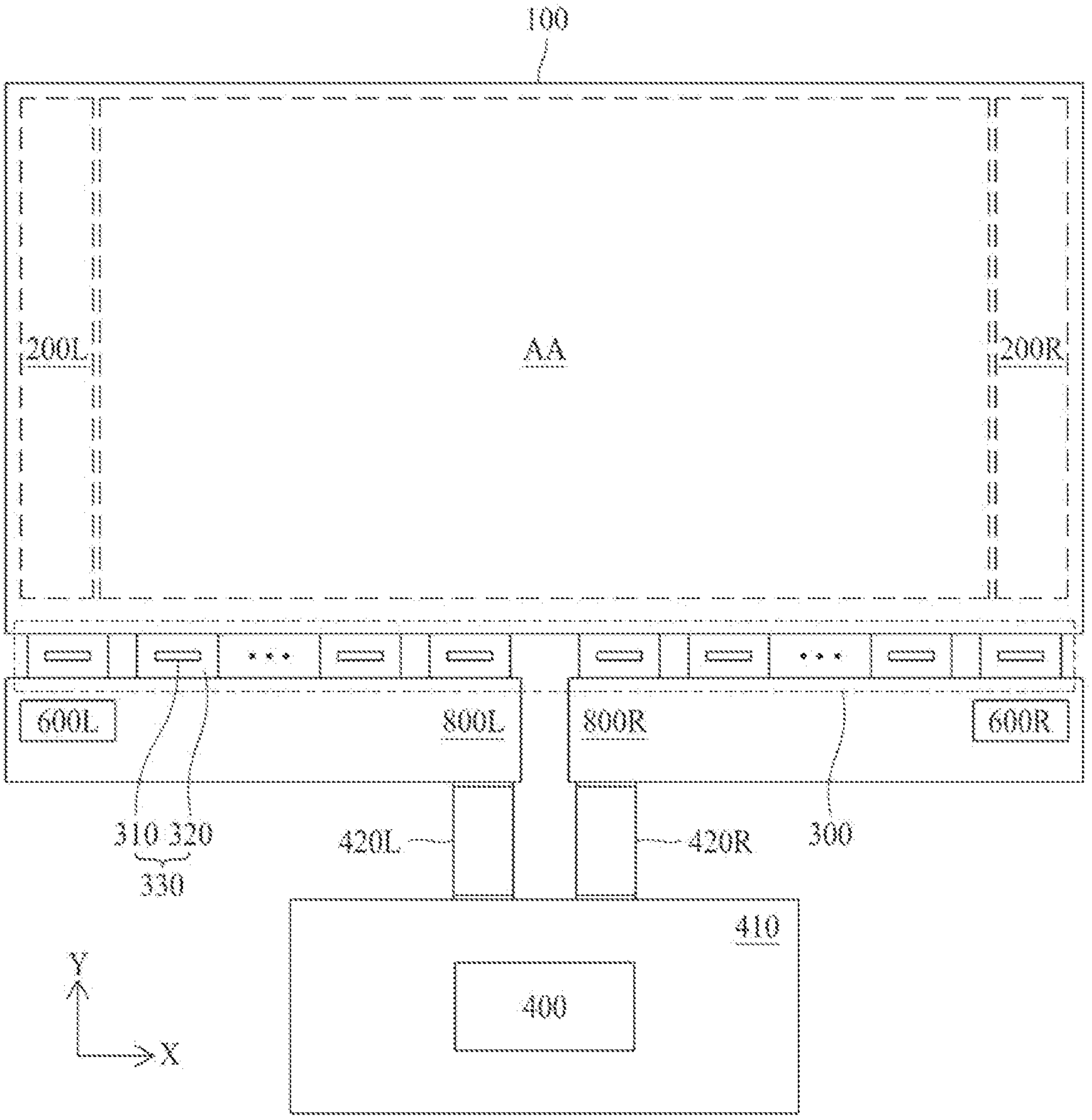
FIG. 3 is a schematic block diagram of a gate driver according to one embodiment of the present disclosure.

FIGS. 1 and 3 are system configurations illustrating a display device according to one embodiment of the present disclosure, and FIG. 2 is an equivalent circuit diagram illustrating a configuration of a subpixel according to one embodiment of the present disclosure.

The display device according to one embodiment of the present disclosure can be any one of various display devices including a liquid crystal display device, an electroluminescent display device, a micro light emitting diode LED display device, and the like. The electroluminescent display device can be an organic light emitting diode OLED display device, a quantum dot light emitting diode display device, or an inorganic light emitting diode display device.

The display device according to one embodiment of the present disclosure can be a flexible display device, such as a foldable display panel, a bendable display, a rollable display panel, and a stretchable display panel.

Referring to FIG. 1, the display device can include a display panel 100, a gate driver 200, a data driver 300, a timing controller 400, a level shifter 600, a gamma voltage generator 700, and a power control circuit 500. The gate driver 200 and the data driver 300 can be defined as a panel driver for driving the display panel 100. The gate driver 200, the data driver 300, the timing controller 400, the gamma voltage generator 700, and the level shifter 600 can be defined as a display driver. The level shifter 600 can be embedded in the power control circuit 500 or can be omittable.

The display panel 100 displays an image through a display area AA in which subpixels SP are arranged in a matrix configuration. The display panel 100 can be a panel in which a touch sensor screen overlapping the pixel matrix of the display area AA can be embedded or attached. The subpixels SP include a red subpixel emitting red light, a green subpixel emitting green light, and a blue subpixel emitting blue light, and can include a white subpixel emitting white light for improving a luminance. Each subpixel SP can be connected to signal lines disposed on the display panel 100. The signal lines disposed on the display panel 100 can include a gate line GL and a data line DL, and further include a power line, a reference line, and the like.

As shown in FIG. 2, each subpixel SP can include a pixel circuit comprising an emission device EL connected between a first power line PW1 for supplying a high-potential driving voltage (first driving voltage) EVDD and a second power line PW2 for supplying a low-potential driving voltage (second driving voltage) EVSS, first and second switching TFTs ST1 and ST2 for independently driving the emission device EL, a driving TFT DT, and a storage capacitor Cst.

The emission device EL can include an anode connected to a source node N2 of the driving TFT DT, a cathode connected to the second power line PW2, and an organic light emitting layer between the anode and the cathode. The anode can be independently provided for each subpixel, however, the cathode can be a common electrode shared by all the subpixels. When a driving current is supplied from the driving TFT DT to the emission device EL, electrons are injected into the organic light emitting layer from the cathode, and holes are injected into the organic light emitting layer from the anode, whereby the electrons and holes are recombined in the organic light emitting layer, and fluorescent or phosphorescent materials are emitted, to thereby generate light with brightness proportional to a current value of the driving current.

The first switching TFT ST1 is driven by a scan signal SCANn supplied from the gate driver 200 to the gate line GLn, and the first switching TFT ST1 can supply a data voltage Vdata, supplied from the data driver 300 to the data line DLm, to a gate node N1 of the driving TFT DT.

The second switching TFT ST2 is driven by a scan signal SCANn supplied from the gate driver 200 to the gate line GLn, and the second switching TFT ST2 can supply a reference voltage Vref, supplied from the data driver 300 to the reference line RLm, to a source node N2 of the driving TFT DT. Meanwhile, for a sensing mode, the second switching TFT ST2 can output a current, in which the characteristics of the driving TFT DT or the characteristics of the emission device EL is reflected, to the reference line RLm.

The first and second switching TFTs ST1 and ST2 can be controlled by the same gate line GLn as shown in FIG. 2 or can be controlled by the different gate lines.

The storage capacitor Cst connected between the gate node N1 and the source node N2 of the driving TFT DT can charge a voltage difference between the data voltage Vdata and the reference voltage Vref supplied to the gate node N1 and the source node N2 through the first and second switching TFTs ST1 and ST2 as a driving voltage Vgs, and can maintain the charged driving voltage Vgs for an emission period in which the first and second switching TFTs ST1 and ST2 are turned-off.

The driving TFT DT controls a light emission intensity of the emission device EL by controlling the current Ids flowing to the emission device EL according to the driving voltage Vgs charged in the storage capacitor Cst.

The power control circuit 500 can generate and output various driving voltages required for the operation of all components of the display device, for example, the panel 100, the gate driver 200, the data driver 300, the timing controller 400, the level shifter 600, and the gamma voltage generator 700, by an input voltage supplied from the external.

The timing controller 400 can receive image data and synchronization signals from an external host system. The host system can be any one of a computer, a TV system, a set-top box, a tablet, a mobile terminal system such as a mobile phone, or the like. The synchronization signals can include a dot clock, a data enable signal, a vertical synchronization signal, a horizontal synchronization signal, and the like.

The timing controller 400 can generate a plurality of data control signals using the synchronization signals and timing setting information (start timing, pulse width, etc.) stored inside the synchronization signals and supplies the data control signals to the data driver 300, and can generate a plurality of control signals and supply the plurality of control signals to the level shifter 600.

The timing controller 400 performs various image processing such as a brightness correction for reducing a power consumption, an image quality correction, etc., and supplies the image-processed data to the data driver 300.

For an additional correction, the timing controller 400 can apply a compensation value for the characteristic deviation of each subpixel stored in a memory before supplying the processed data to the data driver 300. In the sensing mode, the timing controller 400 senses the characteristics of each subpixel SP of the display panel 100 (threshold voltage of the driving TFT, mobility of the driving TFT, threshold voltage of the emission device, etc.) through the data driver 300, and updates the compensation value of each subpixel stored in the memory by the use of the sensing result. The sensing mode of the display device can be performed according to an instruction of a host system, or can be performed by a user request through the host system, or can be performed according to a driving sequence of the timing controller 400.

The gamma voltage generator 700 generates a reference gamma voltage set including a plurality of reference gamma voltages having different voltage levels and supplies the reference gamma voltage set to the data driver 300. The gamma voltage generator 700 generates the plurality of reference gamma voltages corresponding to the gamma characteristics of the display device under the control of the timing controller 400 and supplies the reference gamma voltages to the data driver 300. The gamma voltage generator 700 can be formed in a programmable gamma IC, wherein the gamma voltage generator 700 can receive gamma data from the timing controller 400, generate or adjusts a reference gamma voltage level according to gamma data, and output the reference gamma voltage level to the data driver 300.

The data driver 300 is controlled according to the data control signal supplied from the timing controller 400. The data driver 300 converts digital data received from the timing controller 400 into an analog data signal, and supplies each data signal to each data line DLm of the display panel 100. The data driver 300 can convert the digital data into the analog data signal using gray voltages subdivided by the plurality of reference gamma voltages supplied from the gamma voltage generator 700.

The data driver 300 can supply the reference voltage Vref to the reference line RLm. In the sensing mode, the data driver 300 can sense the electrical characteristics of each subpixels SP through the reference line RLm and can output the sensing result to the timing controller 400.

The level shifter 600 generates a plurality of gate control signals based on the plurality of control signals supplied from the timing controller 400 and supplies the gate control signals to the gate driver 200. The level shifter 600 can supply a plurality of group signals, a plurality of block signals, and a plurality of clock signals by level-shifting or logic-processing the plurality of control signals supplied from the timing controller 400, and can supply the generated group signals, block signals, and clock signals to the gate driver 200.

Meanwhile, if the level shifter 600 is omitted, the timing controller 400 can generate a plurality of gate control signals including a plurality of group signals, a plurality of block signals, and a plurality of clock signals, and can supply the plurality of gate control signals to the gate driver 200.

The gate driver 200 is controlled according to the plurality of gate control signals supplied from the timing controller 400 or the level shifter 600, and individually drives the gate lines of the display panel 100. The gate driver 200 supplies the scan signal of gate-on level to the corresponding gate line during a driving period of each gate line, and supplies the scan signal of gate-off level to the corresponding gate line during a non-driving period of each gate line.

The gate driver 200 can be formed along with TFTs of the pixel matrix of the display area AA and can be embedded in the display panel 100 in the form of a gate-in-panel GIP type. The gate driver 200 can be disposed at one side of a bezel area adjacent to the display area AA, and can supply the scan signal to one end of each of the gate lines. Meanwhile, the gate driver 200 can be disposed at both sides of the bezel area adjacent to the display area AA, and can supply the scan signal to both ends of each of the gate lines.

The TFT disposed in the display area AA of the display panel 100 and the bezel area including the gate driver 200 can be applied with at least any one of an amorphous TFT using an amorphous silicon semiconductor layer, a poly TFT using a polysilicon semiconductor layer, and an oxide TFT using a metal oxide semiconductor layer.

In particular, the gate driver 200 can generate a plurality of scan signals by combining the plurality of group signals, the plurality of block signals, and the plurality of clock signals supplied from the timing controller 400 or the level shifter 600, and can output each scan signal to each of the plurality of gate lines. The gate driver 200 can generate the 'n' scan signals (=x×y×z) by the combination of 'x' clock signals ('x' is an integer of 2 or more), 'y' block signals ('y' is an integer of 2 or more), and 'z' group signals ('z' is an integer of 2 or more), and can individually drive the 'n' gate lines.

Accordingly, each stage of the gate driver 200 does not require an output of a carry signal for controlling the operation of the other stage, whereby it is possible to reduce the number of TFTs constituting each stage. A detailed description thereof will be given later.

Referring to FIG. 3, the display device according to one embodiment of the present disclosure can include a display panel 100 including a gate driver 200L and 200R of GIP type, a data driver 300, a control PCB 410 on which a timing controller 400 is mounted, and a source PCB 800L and 800R on which a level shifter 600L and 600R is mounted.

The timing controller 400 mounted on the control PCB 410 can be connected to the source PCB 800L and 800R through a flat flexible cable FFC 420L and 420R. A gamma voltage generator 700 and a power control circuit 500 shown in FIG. 1 can be mounted on the control PCB 410.

The data driver 300 includes a plurality of data integrated circuits ICs 310 arranged in the X-axis direction to divide and drive data lines disposed in the display area AA of the display panel 100, and each of the data ICs 310 can be individually mounted on each circuit film 320 to constitute a chip on film COF 330. The plurality of COFs 330, on which the data IC 310 is mounted, can be bonded to and connected to the display panel 100 and the source PCB 800L and 800R through an anisotropic conductive film ACF in a tape automatic bonding TAB method, and can be located between the display panel 100 and the source PCB 800L and 800R.

The level shifters 600L and 600R can be mounted on the source PCBs 800L and 800R, respectively. The level shifters 600L and 600R can supply gate control signals to the first and second gate drivers 200L and 200R through the outermost COF 330.

The gate drivers 200L and 200R of GIP type can be disposed at both sides of a bezel area adjacent to the display area AA of the display panel 100. The gate drivers 200L and 200R can receive the plurality of gate control signals from each of the level shifters 600L and 600R, thereby individually driving the gate lines disposed in the display area AA.

The gate drivers 200L and 200R can generate the plurality of scan signals by the combination of the plurality of group signals, the plurality of block signals, and the plurality of clock signals received from the level shifters 600L and 600R, and can output the plurality of scan signals to the plurality of gate lines, respectively.

Accordingly, each stage of the gate driver 200L and 200R does not need the output of the carry signal for controlling the operation of the other stage, whereby it is possible to reduce the number of TFTs constituting each stage. A detailed description thereof will be given later.

As described above, the gate driver 200, 200L, and 200R according to one embodiment of the present disclosure does not require the carry signal, thereby preventing display defects caused by the non-output of the carry signal. In addition, it is possible to reduce the circuit configuration and size of the gate driver 200, 200L and 200R by reducing the number of TFTs constituting the gate drivers 200, 200L and 200R, and to decrease the size of the bezel area where the gate driver 200, 200L and 200R is located in the display panel 100.

Figure 4:
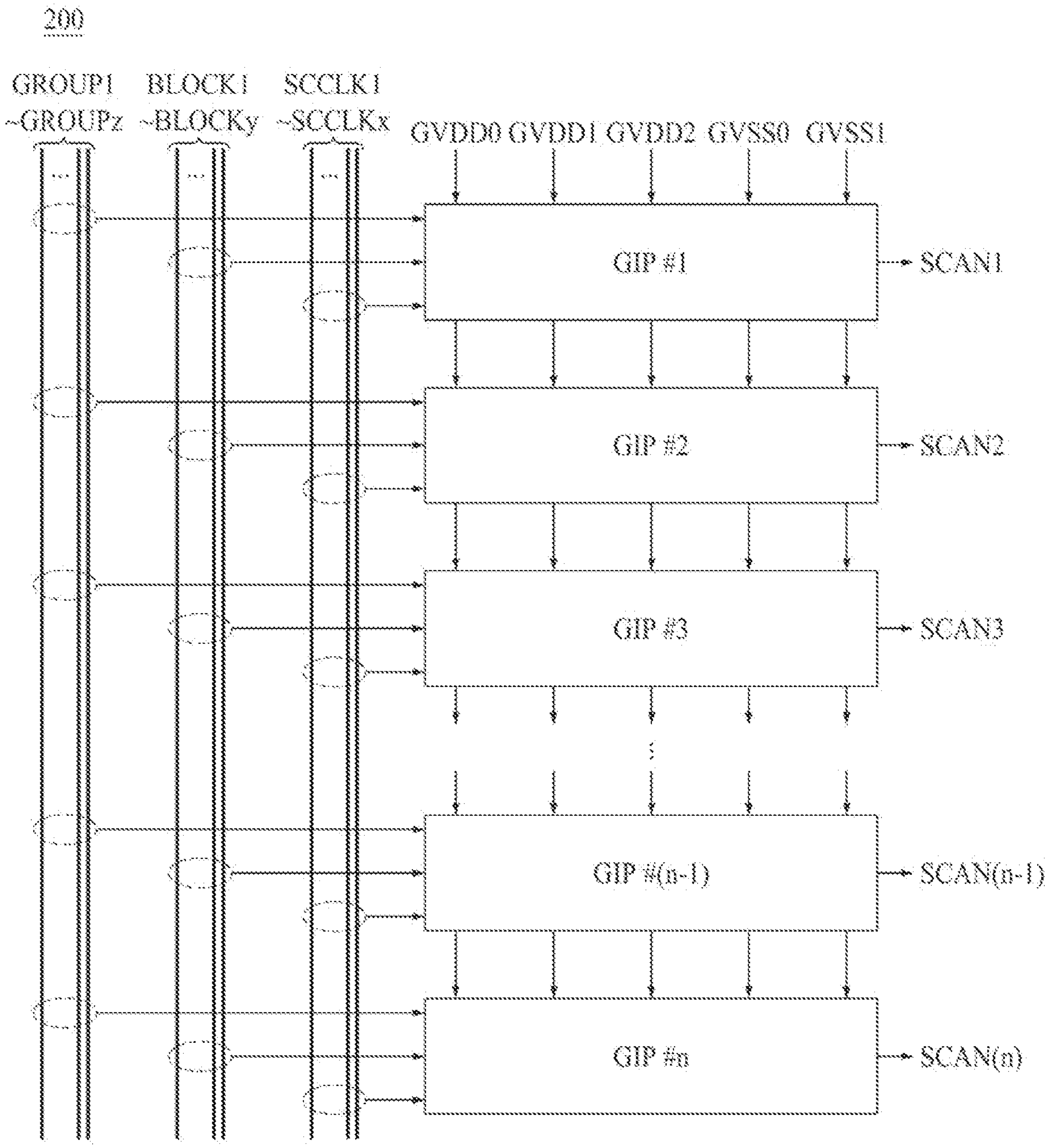
FIG. 4 is a block diagram illustrating a configuration of a gate driver according to one embodiment of the present disclosure.
Figure 5:
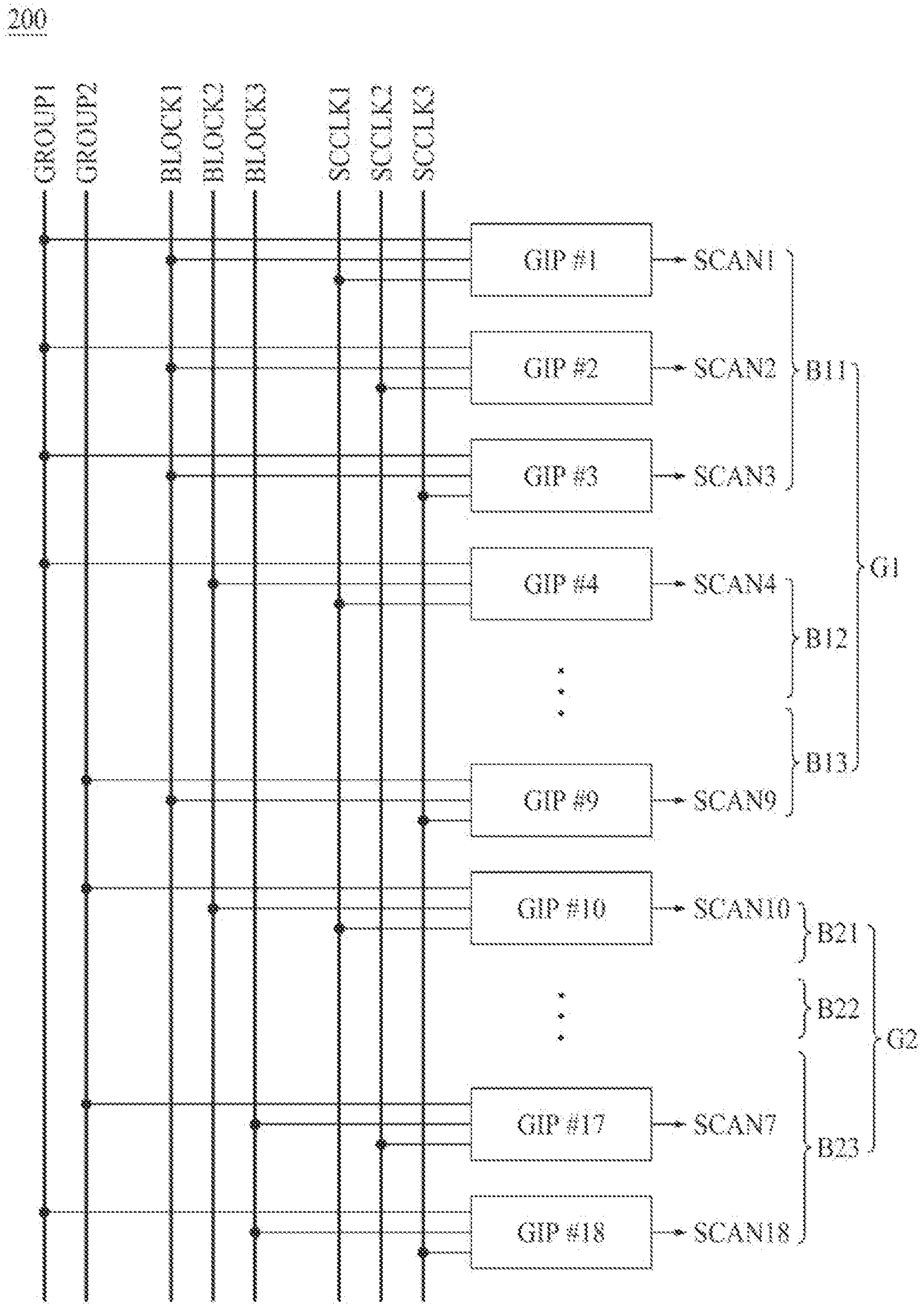
FIG. 5 is a block diagram illustrating an exemplary configuration of a gate driver according to one embodiment of the present disclosure.

FIGS. 4 and 5 are block diagrams schematically illustrating the configuration of the gate driver according to one embodiment of the present disclosure.

Referring to FIG. 4, the gate driver 200 includes the plurality of stages GIP #1~GIP #n for individually outputting the plurality of scan signals SCAN1~SCAN(n) to the plurality of gate lines, each stage being driven independently. Herein, 'n' denotes the total number of gate lines disposed on the display panel 100.

The gate driver 200 can receive the plurality of gate control signals from the timing controller 400 or the level shifter 600. The plurality of gate control signals can include 'z' group signals GROUP1~GROUPz, 'y' block signals BLOCK1~BLOCKy, and 'x' clock signals SCCLK1~SCCLKx.

The 'n' stages GIP #1~GIP #n constituting the gate driver 200 can be commonly supplied with a plurality of power supply voltages GVDD0, GVDD1, GVDD2, GVSS0, and GVSS1, which are output from the power control circuit 500.

Each of the 'n' stages GIP #1~GIP #n constituting the gate driver 200 can directly receive any one of the 'z' group signals GROUP1~GROUPz, any one of the 'y' block signals BLOCK1~BLOCKy, and any one of the 'x' clock signals SCCLK1~SCCLKx, can generate each scan signal SCANk (k=1~n), and can output the generated scan signal.

The 'n' stages GIP #1~GIP #n can be divided into 'z' groups to which the 'z' group signals GROUP1~GROUPz are individually supplied. Each of the 'z' groups can be divided into 'y' blocks to which the 'y' block signals BLOCK1~BLOCKy are individually supplied. Each of the 'y' blocks can include 'x' stages to which the 'x' clock signals SCCLK1 SCCLKx are individually supplied.

The 'n' stages GIP #1~GIP #n can generate the 'n' (=x×y×z) scan signals by the combination of the 'z' group signals, the 'y' block signals, and the 'x' clock signals, and can individually drive the 'n' gate lines.

For example, the gate driver 200 for driving UHD 2160 gate lines can include 2160 stages, and can individually generate and output 2160 (=12×12×15) scan signals by combining 12 clock signals, 12 block signals, and 15 group signals.

For convenience of explanation, FIG. 5 illustrates an exemplary case where the gate driver 200 includes 18 (n=18) stages GIP #1~GIP #18.

The gate driver 200 including the first to eighteenth stages GIP #1~GIP #18 can receive the 2 group signals GROUP1 and GROUP2, the 3 block signals BLOCK1~BLOCK3, and the 3 clock signals SCCLK1~SCCLK 3 from the timing controller 400 or the level shifter 600, can individually generate the 18 scan signals SCAN1~SCAN18, and can output the scan signals to the 18 gate lines, respectively.

The first to eighteenth stages GIP #1~GIP #18 can be divided into the first group G1 to which the first group signal GROUP1 is supplied, and the second group G2 to which the second group signal GROUP2 is supplied. The first group G1 can be divided into the 1-1 block B11 to which the first block signal BLOCK1 is supplied, the 1-2 block B12 to which the second block signal BLOCK2 is supplied, and the 1-3 block B13 to which the third block signal BLOCK3 is supplied. The second group G2 can be divided into the 2-1 block B21 to which the first block signal BLOCK1 is supplied, the 2-2 block B22 to which the second block signal BLOCK2 is supplied, and the 2-3 block B23 to which the third block signal BLOCK3 is supplied. Each of the 1-1 block B11, the 1-2 block B12, and the 1-3 block B13 included in the first group G1, and each of the 2-1 block B21, the 2-2 block B22, and the 2-3 block B23 included in the second group G2 can include the three stages GIP #3*k*-2~GIP #3*k* (k=1~6) to which the first to third clock signals SCCLK1~SCCLK3 are individually supplied.

Accordingly, the gate driver 200 according to one embodiment of the present disclosure can generate the 'n' (=x×y×z) scan signals by the combination of the 'z' group signals GROUP1~GROUPz, the 'y' block signals BLOCK1~BLOCKy, and the 'x' clock signals SCCLK1~SCCLKx, which are directly provided from the timing controller 400 or level shifter 600, and can output the generated scan signals, whereby each of the 'n' stages GIP #1~GIP #n does not require the carry signal for controlling the other stage, to thereby prevent a problem caused by a failure of the carry signal.

Figure 6:
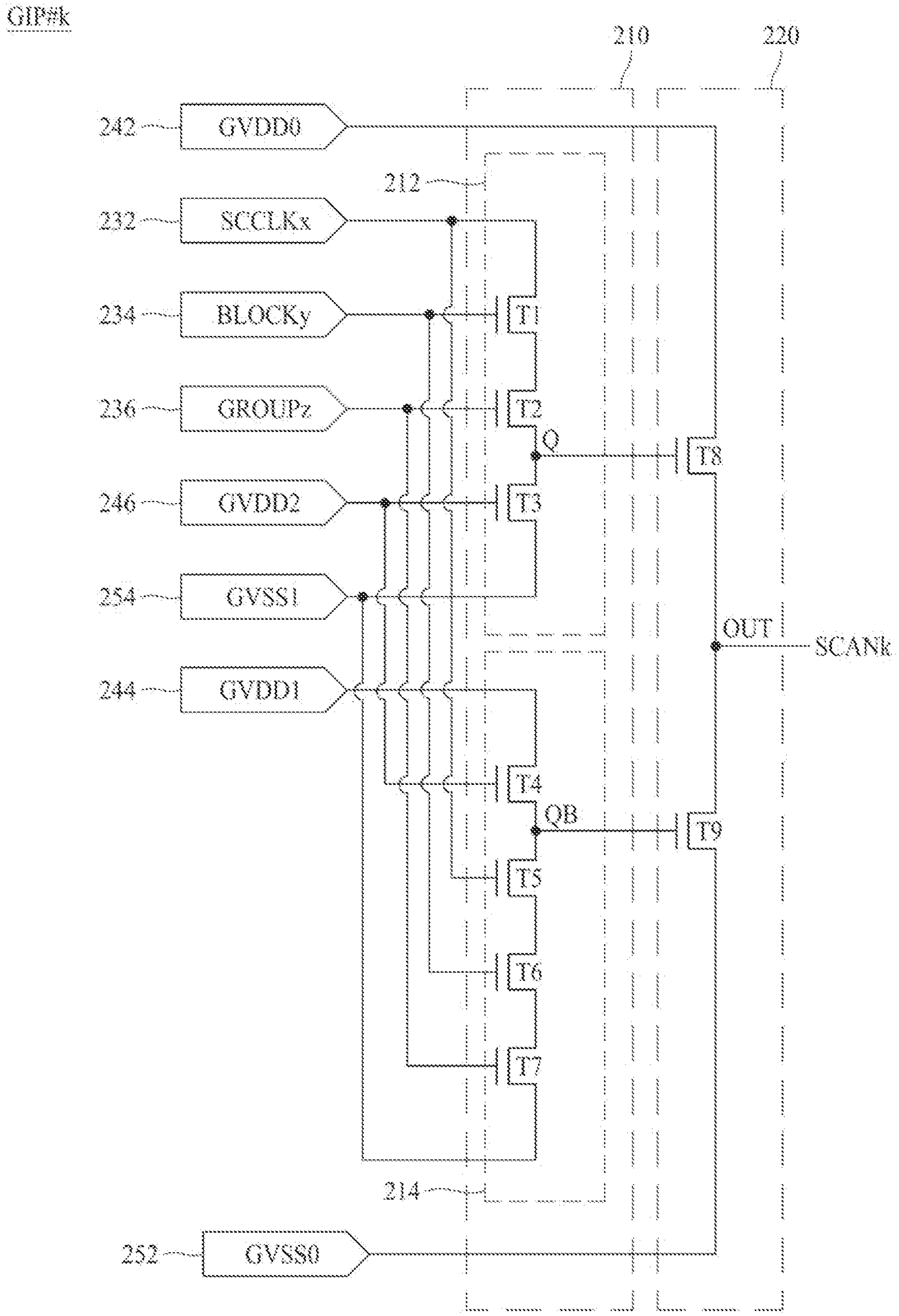
FIG. 6 is an equivalent circuit diagram illustrating a configuration of each stage of a gate driver according to one embodiment of the present disclosure.

FIG. 6 is an equivalent circuit diagram illustrating a basic configuration of each GIP stage in the gate driver according to one embodiment of the present disclosure.

Referring to FIG. 6, each of the stages GIP #k (k=1~n) can include a clock line 232 supplied with any one clock signal SCCLKx of the 'x' clock signals SCCLK1 SCCLKx, a block line 234 supplied with any one block signal BLOCKy of the 'y' block signals BLOCK1~BLOCKy, and a group line 236 supplied with any one group signal GROUPz of the 'z' group signals GROUP1~GROUPz.

Each stage GIP #k can include a plurality of power supply lines 242, 244, 246, 252, and 254 supplied with the plurality of power supply voltages GVDD0, GVDD1, GVDD2, GVSS0, and GVSS1.

For example, each stage GIP #k can include the first power line 242 supplied with a first gate-on voltage GVDD0, the second power line 244 supplied with a second gate-on voltage GVDD1, the third power line 246 supplied with a third gate-on voltage GVDD2, the fourth power line 252 supplied with a first gate-off voltage GVSS0, and the fifth power line 254 supplied with a second gate-off voltage GVSS1.

Herein, the first to third gate-on voltages GVDD0, GVDD1 and GVDD2 indicate an activation voltage level for turning on the TFT, and can be defined as first to third gate high voltages, or first to third high-potential power supply voltages. The first to third gate-on voltages GVDD0, GVDD1, and GVDD2 can have the same voltage level or different voltages levels satisfying GVDD0<GVDD1<GVDD2. The first and second gate-off voltages GVSS0 and GVSS1 can be defined as first and second gate low voltages or first and second low-potential power supply voltages. The first and second gate-off voltages GVSS0 and GVSS1 can have the same voltage level or different voltages levels satisfying GVSS1<GVSS0.

Each stage GIP #k can include an output buffer 220 which generates the scan signal SCANk having the first gate-on voltage GVDD0 and the first gate-off voltage GVSS0 in response to the control of first node Q and second node QB, and outputs the scan signal SCANk through an output node OUT. Each stage GIP #k can include a controller 210 which controls the output buffer 220 through the first node Q and the second node QB by the combination of the clock signal SCCLKx, the block signal BLOCKy, and the group signal GROUPz. The controller of each stage GIP #k can include a first controller 212 which controls the first node Q by the combination of the clock signal SCCLKx supplied through a clock line, the block signal BLOCKy supplied though a block line, and the group signal GROUPz supplied through a group line, and a second controller 214 which controls the second node QB to be opposite to the operation of the first node Q by the combination of the clock signal SCCLKx, the block signal BLOCKy, and the group signal GROUPz.

The output buffer 220 can include a pull-up transistor T8 controlled by the voltage of the first node Q and configured to output the first gate-on voltage GVDD0 to the output node OUT, and a pull-down transistor T9 controlled by the voltage of the second node QB and configured to output the first gate-off voltage GVSS0 to the output node OUT.

The pull-up TFT T8 can be turned on when the voltage of the first node Q, which is an output of the first controller 212, is in the gate-on level, and can output the gate-on level of the scan signal SCANk by using the first gate-on voltage GVDD0 supplied through the first power line 242.

The pull-down TFT T9 can be turned on when the voltage of the second node QB, which is an output of the second controller 214, is in the gate-on level, and can output the gate-off level of the scan signal SCANk by using the first gate-off voltage GVSS0 supplied through the fourth power line 252.

The first controller 212 can output the gate-on level of the clock signal SCCLKx to the first node Q and can activate the first node Q when all of the clock signal SCCLKx, the block signal BLOCKy, and the group signal GROUPz are in the gate-on level (for example, high level), to thereby turn-on the pull-up TFT T8. The first controller 212 can output the gate-off level of the clock signal SCCLKx or the second gate-off voltage GVSS1 to the first node Q and can deactivate the first node Q when at least any one of the clock signal SCCLKx, the block signal BLOCKy, and the group signal GROUPz is the gate-off level (for example, low level), to thereby turn-off the pull-up TFT T8.

For example, the first controller 212 can include first and second TFTs T1 and T2 connected in series between the clock line 232 and the first node Q1 and controlled by the block signal BLOCKy and the group signal GROUPz, and a third TFT T3 connected between the first node Q and the fifth power line 254 and controlled by the third gate-on voltage GVDD2.

The first TFT T1 can be controlled and turned-on by the block signal BLOCKy supplied to a gate electrode from the block line 234, and can output the clock signal SCCLKx supplied to a drain electrode from the clock line 232 to the drain electrode of the second TFT T2.

The second TFT T2 can be controlled and turned-on by the group signal GROUPz supplied to the gate electrode from the group line 236, and can output the clock signal SCCLKx supplied through the first TFT T1 to the first node Q.

The third TFT T3 can be turned-on by the third gate-on voltage GVDD2 supplied to the gate electrode from the third power line 246, and can connect the first node Q to the second gate-off voltage GVSS1 of the fifth power line 254.

The first and second TFTs T1 and T2 output the gate-on level of the clock signal SCCLKx to the first node Q when all the clock signal SCCLKx, the block signal BLOCKy, and the group signal GROUPz are in the gate-on level (high level), and then activates the first node Q, to thereby turn-on the pull-up TFT T8.

The first and second TFTs T1 and T2 output the gate-off level of the clock signal SCCLKx to the first node Q when the block signal BLOCKy and the group signal GROUPz are in the gate-on level and the clock signal SCCLKx is in the gate-off level, and then deactivates the first node Q, to thereby turn-off the pull-up TFT T8.

When at least any one of the clock signal SCCLKx, the block signal BLOCKy, and the group signal GROUPz is in the gate-off level, the third TFT T3 outputs the second gate-off voltage GVSS1 to the first node Q, and deactivates the first node Q, to thereby turn-off the pull-up TFT T8.

When all the clock signal SCCLKx, the block signal BLOCKy, and the group signal GROUPz are in the gate-on level, the second controller 214 outputs the second gate-off voltage GVSS1 to the second node QB, and deactivates the second node QB, to thereby turn-off the pull-down TFT T9. When at least any one of the clock signal SCCLKx, the block signal BLOCKy, and the group signal GROUPz is in the gate-off level, the second controller 214 outputs the second gate-on voltage GVDD1 to the second node QB, and activates the second node QB, to thereby turn-on the pull-down TFT T9.

For example, the second controller 214 can include a fourth TFT T4 connected between the second power line 244 and the second node QB and controlled by the third gate-on voltage GVDD2 of the third power line 246, and fifth to seventh TFTs T5, T6, and T7 connected in series between the second node QB and the fifth power line 254 and controlled by the clock signal SCCLKx, the block signal BLOCKy, and the group signal GROUPz, respectively. The second controller 214 can output the second gate-off voltage to the second node QB through the fifth to seventh transistors T5~T7 when the block signal and the group signal are in the gate-on level, and the second controller 214 can output the second gate-on voltage to the second node QB through the fourth transistor T4 when at least one of the clock signal, the block signal, and the group signal is in the gate-off level.

The fourth TFT T4 is turned-on by the third gate-on voltage GVDD2 supplied to the gate electrode from the third power line 246, and can output the second gate-on voltage GVDD1 supplied to the drain electrode from the second power line 244 to the second node QB. When the fourth TFT T4 is turned-on by the third gate-on voltage GVDD2 of the gate electrode, the third gate-on voltage GVDD2 of the gate electrode is higher than the second gate-on voltage GVDD1 of the drain electrode, whereby the fourth TFT T4 is certainly maintained in the turn-on state.

The fifth TFT T5 can be controlled by the clock signal SCCLKx supplied to the gate electrode from the clock line 232, and can connect the second node QB to the drain electrode of the sixth TFT T6.

The sixth TFT T6 can be controlled by the block signal BLOCKy supplied from the block line 234 to the gate electrode, and can connect the source electrode of the fifth TFT T5 to the drain electrode of the seventh TFT T7.

The seventh TFT T7 is controlled by the group signal GROUPz supplied from the group line 236 to the gate electrode, and can connect the source electrode of the sixth TFT T6 to the second gate-off voltage GVSS1 of the fifth power line 254.

When all the clock signal SCCLKx, the block signal BLOCKy, and the group signal GROUPz are in the gate-on level, the fifth to seventh TFTs can connect the second node QB to the second gate-off voltage GVSS1 of the fifth power line 254, whereby the second node QB is deactivated, and the pull-down TFT T9 is turned-off.

When the pull-up TFT T8 and the pull-down TFT T9 are turned-off by the second gate-off voltage GVSS1 of the corresponding gate electrode, the second gate-off voltage GVSS1 of the corresponding gate electrode is lower than the first gate-off voltage GVSS0 of the corresponding source electrode. Thus, the pull-up TFT T8 and the pull-down TFT T9 are certainly maintained in the turn-off state even in case of a negative threshold voltage, whereby it is possible to prevent a leakage current.

According as the clock signal SCCLKx is connected to the drain electrode of the first TFT T1 by the first controller 212, the number of TFTs T1~T3 constituting the first controller 212 can be reduced to be smaller than the number of TFTs T4~T7 constituting the second controller 214.

Accordingly, each stage GIP #k can turn-on the pull-up TFT T8 and turn-off the pull-down TFT T9 when all the clock signal SCCLKx, the block signal BLOCKy, and the group signal GROUPz are in the gate-on level, whereby the first gate-on voltage GVDD0 can be output as the gate-on level of the scan signal SCANk. Meanwhile, when at least one of the clock signal SCCLKx, the block signal BLOCKy, and the group signal GROUPz is in the gate-off level, each stage GIP #k can turn-off the pull-up TFT T8 and turn-on the pull-down TFT T9, whereby the first gate-off voltage GVSS0 can be output to the gate-off level of the scan signal SCANk.

Accordingly, in case of the gate driver 200 according to one embodiment of the present disclosure, each stage GIP #k (k=1~9) is formed of the nine TFTs. Thus, in comparison to a configuration of each stage of a gate driver according to a comparative example requiring a carry signal, which includes an input portion, a reset portion, an inverter, an output buffer, and a stabilization portion, each stage according to the embodiment of the present disclosure enables to reduce the number of TFTs therein, whereby it is possible to reduce the circuit configuration and size of the gate driver 200, to thereby reduce the size of bezel area.

Figure 7:
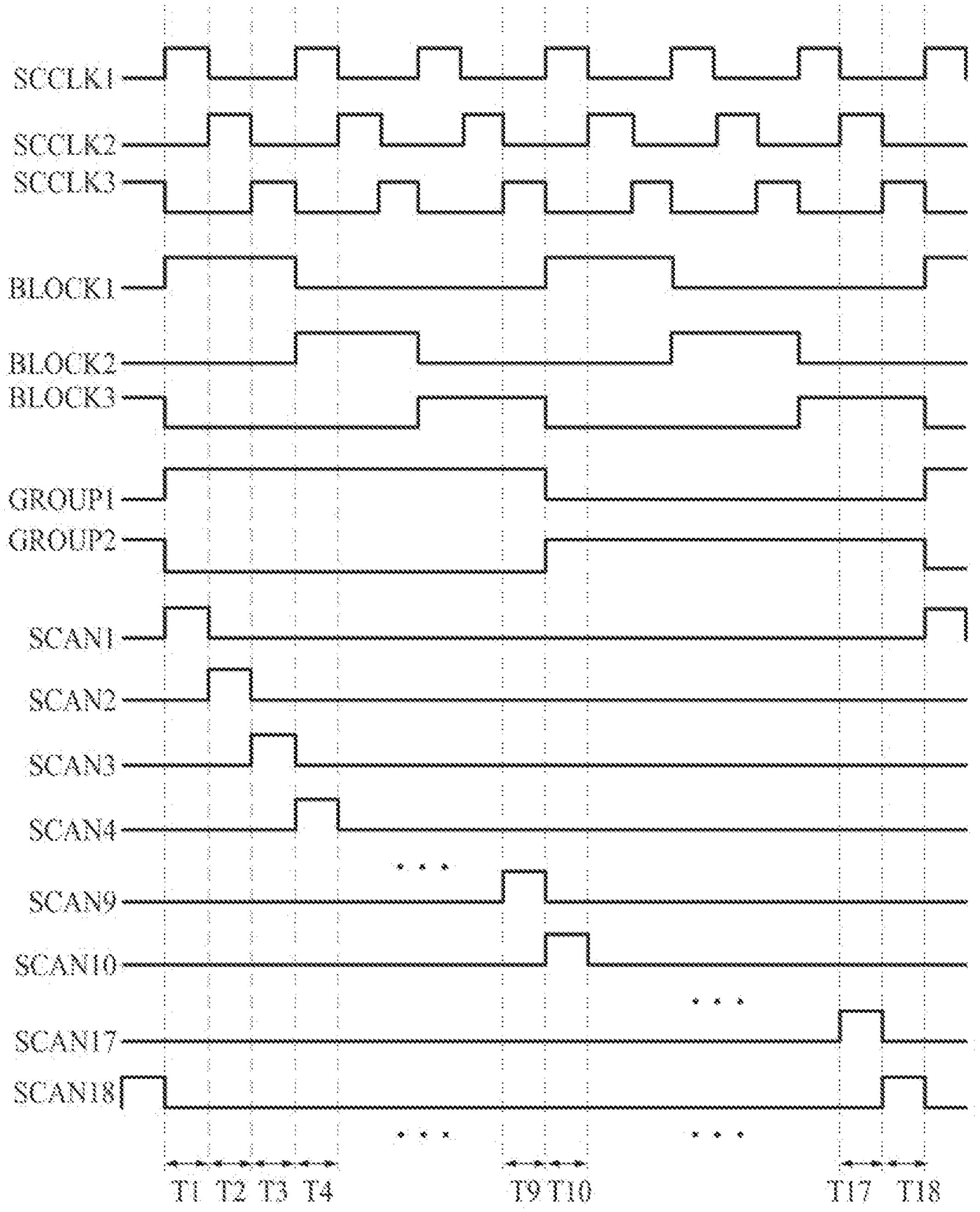
FIG. 7 is a driving waveform diagram of a gate driver according to one embodiment of the present disclosure.

FIG. 7 is a driving waveform diagram of the gate driver shown in FIGS. 5 and 6 according to one embodiment of the present disclosure.

Referring to FIGS. 5 to 7, the gate driver 200 having the 18 stages GIP #1~GIP #18 can receive the 'x=3' clock signals SCCLK1, SCCLK2, and SCCLK3, 'y=3' block signals BLOCK1, BLOCK2, and BLOCK3, and 'z=2' group signals GROUP1 and GROUP2, and can sequentially generate and output the 18 scan signals SCAN1~SCAN18 without using the carry signal. The 18 scan signals SCAN1~SCAN18 can sequentially output the gate-on level of the scan signals SCAN1~SCAN18 from respective first to eighteenth periods T1~T18.

The three-phase clock signals SCCLK1, SCCLK2, and SCCLK3 having different phases can have a first section including a gate-on level (high level) part of the first period and a gate-off level (low level) part of the second period, and the gate-on-level part of the first period can be phase-delayed and supplied in sequence.

The first period of each clock signal SCCLK1, SCCLK2, and SCCLK3 can include at least one horizontal period H corresponding to the period in which the scan signal of the gate-on level is supplied to each gate line. The second period can be set to be longer than the first period.

The three-phase block signals BLOCK1, BLOCK2, and BLOCK3 having different phases can have a second section including a gate-on level (high level) part of the third period and a gate-off level (low level) part of the fourth period, and the gate-on-level part of the third period can be phase-delayed and supplied in sequence.

The third period of each block signal BLOCK1, BLOCK2, and BLOCK3 can be set to be longer than time overlapping the first periods of the clock signals SCCLK1, SCCLK2, and SCCLK3, and the fourth period can be set to be longer than the third period. In other words, the third period of the gate-on level in each of the 'y' block signals BLOCK1~BLOCKy can be set to be greater than time overlapping the first periods of the 'x' clock signals SCCLK1~SCCLKx.

The two-phase group signals GROUP1 and GROUP2 having different phases can have a third section including a gate-on level (high level) part of the fifth period and a gate-off level (low level) part of the sixth period, and the gate-on level part of the fifth period can be phase-delayed and supplied in sequence.

The fifth period of each group signal GROUP1 and GROUP2 can be set to be longer than time overlapping the third periods of the block signals BLOCK1, BLOCK2, and BLOCK3, and the sixth period can be set to be longer than the fifth period. In other words, the fifth period of the gate-on level in each of the 'z' group signals GROUP1~GROUPz can be set to be greater than time overlapping the third periods of the 'y' block signals BLOCK1~BLOCKy.

Referring to FIGS. 5 and 7, among the first to ninth stages GIP #1~GIP #9 included in the first group G1 supplied with the first group signal GROUP1, the first to third stages GIP #1, GIP #2, and GIP #3 of the 1-1 block B11 supplied with the first block signal BLOCK1 can be supplied with the first to third clock signals SCCLK1, SCCLK2, and SCCLK3, respectively. The first to third stages GIP #1, GIP #2, and GIP #3 can sequentially output the gate-on level of the first to third scan signals SCAN1, SCAN2, and SCAN3 which respectively overlap the gate-on level of the first to third clock signals SCCLK1, SCCLK2, and SCCLK3 in the overlap portion between the gate-on level of the first group signal GROUP1 and the gate-on level of the first block signal BLOCK1, and can output the gate-off level in the remaining portions.

Among the first to ninth stages GIP #1~GIP #9 included in the first group G1, the fourth to sixth stages GIP #4, GIP #5, and GIP #6 of the 1-2 block B12 supplied with the second block signal BLOCK2 can be supplied with the first to third clock signals SCCLK1, SCCLK2, and SCCLK3, respectively. The fourth to sixth stages GIP #4, GIP #5, and GIP #6 can sequentially output the gate-on level of the fourth to sixth scan signals SCAN4, SCAN5, and SCAN6 which respectively overlap the gate-on level of the first to third clock signals SCCLK1, SCCLK2, and SCCLK3 in the overlap portion between the gate-on level of the first group signal GROUP1 and the gate-on level of the second block signal BLOCK2, and can output the gate-off level in the remaining portions.

Among the first to ninth stages GIP #1~GIP #9 included in the first group G1, the seventh to ninth stages GIP #7, GIP #8, and GIP #9 of the 1-3 block B13 supplied with the third block signal BLOCK3 can be supplied with the first to third clock signals SCCLK1, SCCLK2, and SCCLK3, respectively. The seventh to ninth stages GIP #7, GIP #8, and GIP #9 can sequentially output the gate-on level of the seventh to ninth scan signals SCAN7, SCAN8, and SCAN9 which respectively overlap the gate-on level of the first to third clock signals SCCLK1, SCCLK2, and SCCLK3 in the overlap portion between the gate-on level of the first group signal GROUP1 and the gate-on level of the third block signal BLOCK3, and can output the gate-off level in the remaining portions.

Among the tenth to eighteenth stages GIP #10~GIP #18 included in the second group G2 supplied with the second group signal GROUP2, the tenth to twelfth stages GIP #10, GIP #11, and GIP #12 of the 2-1 block B21 supplied with the first block signal BLOCK1 can be supplied with the first to third clock signals SCCLK1, SCCLK2, and SCCLK3, respectively. The tenth to twelfth stages GIP #10, GIP #11, and GIP #12 can sequentially output the gate-on level of the tenth to twelfth scan signals SCAN10, SCAN11, and SCAN12 which respectively overlap the gate-on level of the first to third clock signals SCCLK1, SCCLK2, and SCCLK3 in the overlap portion between the gate-on level of the second group signal GROUP2 and the gate-on level of the first block signal BLOCK1, and can output the gate-off level in the remaining portions.

Among the tenth to eighteenth stages GIP #10~GIP #18 included in the second group G2, the thirteenth to fifteenth stages GIP #13, GIP #14, and GIP #15 of the 2-2 block B22 supplied with the second block signal BLOCK2 can be supplied with the first to third clock signals SCCLK1, SCCLK2, and SCCLK3, respectively. The thirteenth to fifteenth stages GIP #13, GIP #14, and GIP #15 can sequentially output the gate-on level of the thirteenth to fifteenth scan signals SCAN13, SCAN14, and SCAN15 which respectively overlap the gate-on level of the first to third clock signals SCCLK1, SCCLK2, and SCCLK3 in the overlap portion between the gate-on level of the second group signal GROUP2 and the gate-on level of the second block signal BLOCK2, and can output the gate-off level in the remaining portions.

Among the tenth to eighteenth stages GIP #10~GIP #18 included in the second group G2, the sixteenth to eighteenth stages GIP #16, GIP #17, and GIP #18 of the 2-3 block B23 supplied with the third block signal BLOCK3 can be supplied with the first to third clock signals SCCLK1, SCCLK2, and SCCLK3, respectively. The sixteenth to eighteenth stages GIP #16, GIP #17, and GIP #18 can sequentially output the gate-on level of the sixteenth to eighteenth scan signals SCAN16, SCAN17, and SCAN18 which respectively overlap the gate-on level of the first to third clock signals SCCLK1, SCCLK2, and SCCLK3 in the overlap portion between the gate-on level of the second group signal GROUP2 and the gate-on level of the third block signal BLOCK3, and can output the gate-off level in the remaining portions.

As described above, the gate driver 200, 200L, and 200R of the display device according to one embodiment of the present disclosure generates and outputs the 'n' (=x×y×z) scan signals by the combination of the 'z' group signals GROUP1~GROUPz, the 'y' block signals BLOCK1~BLOCKy, and the 'x' clock signals SCCLK1~SCCLKx, which are directly supplied from the timing controller 400 or the level shifters 600, 600L, and 600R, whereby the carry signal of controlling the other stage is unnecessary for each of the 'n' stages GIP #1~GIP #n, to thereby prevent a problem caused by a failure of the carry signal.

Further, in case of the gate driver 200, 200L, and 200R of the display device according to one embodiment of the present disclosure, each stage GIP #k is formed of the nine TFTs. Thus, in comparison to the configuration of each stage of the gate driver according to the comparative example requiring the carry signal, each stage according to the embodiment of the present disclosure enables to reduce the number of TFTs therein, whereby it is possible to reduce the circuit configuration and size of the gate driver 200, 200L, and 200R, to thereby reduce the size of bezel area in the display panel 100.

According to one embodiment of the present disclosure, the gate driver and the display device generate and output the scan signal by the combination of the group signal, the block signal, and the clock signal directly supplied from the timing controller or the level shifter in each stage of the gate driver, thereby preventing a display failure caused by a non-output of the carry signal.

In the gate driver and the display device according to one embodiment of the present disclosure, the number of TFTs in each stage can be reduced to 9 so that it is possible to reduce the circuit configuration and size of the gate driver, to thereby reduce the size of bezel area in the display panel.

The gate driver and the display device comprising the same according to one or more embodiments of the present disclosure can be applied to various electronic devices. For example, the gate driver and the display device comprising the same according to one embodiment of the present disclosure can be applied to a mobile device, a video phone, a smart watch, a watch phone, a wearable device, a foldable device, a rollable device, a bendable device, a flexible device, a curved device, an electronic diary, electronic book, a portable multimedia player (PMP), a personal digital assistant (PDA), MP3 player, a mobile medical device, a desktop PC, a laptop PC, a netbook computer, a workstation, a navigator, a vehicle navigator, a vehicle display device, a television, a wall paper display device, a signage device, a game device, a notebook computer, a monitor, a camera, a camcorder, and home appliances.

A gate driver according to some embodiments can comprise a plurality of stages configured to individually drive a plurality of gate lines by a combination of a plurality of group signals, a plurality of block signals, and a plurality of clock signals, wherein each of the plurality of stages driven independently includes an output buffer including a pull-up transistor configured to generate and output a gate-on level of the scan signal under the control of a first node, and a pull-down transistor configured to generate and output a gate-off level of the scan signal under the control of a second node, a first controller configured to control the first node by the combination of the group signal supplied through a group line among the plurality of group signals, the block signal supplied through a block line among the plurality of block signals, and the clock signal supplied through a clock line among the plurality of clock signals, and a second controller configured to control the second node to be opposite to the operation of the first node by the combination of the group signal, the block signal, and the clock signal.

A display device according to some embodiments can include the above gate driver embedded in a display panel.

The first controller according to some embodiments can turn-on the pull-up transistor by activating the first node when all the clock signal, the block signal, and the group signal are in the gate-on level. The first controller according to some embodiments can turn-off the pull-up transistor by deactivating the first node when at least any one of the clock signal, the block signal, and the group signal is in the gate-off level.

The second controller according to some embodiments can turn-off the pull-down transistor by deactivating the second node when all the clock signal, the block signal, and the group signal are in the gate-on level. The second controller according to some embodiments can turn-on the pull-down transistor by activating the second node when at least any one of the clock signal, the block signal, and the group signal is in the gate-off level.

The pull-up transistor according to some embodiments can output a first gate-on voltage, supplied through a first power line, to the gate-on level of the scan signal when the pull-up transistor is turned-on by the first controller. The pull-down transistor according to some embodiments can output a first gate-off voltage, supplied through a fourth power line, to the gate-off level of the scan signal when the pull-down transistor is turned-on by the second controller.

The first controller according to some embodiments can include a first transistor controlled by the block signal and configured to output the clock signal, a second transistor controlled by the group signal and configured to connect the first transistor to the first node, and a third transistor controlled by a third gate-on voltage supplied through a third power line, and configured to connect a fifth power line supplied with a second gate-off voltage to the first node.

The first controller according to some embodiments can output the clock signal to the first node through the first and second transistors when the block signal and the group signal are in the gate-on level. The first controller according to some embodiments can output the second gate-off voltage to the first node through the third transistor when at least one of the clock signal, the block signal, and the group signal is in the gate-off level.

The second controller according to some embodiments can include a fourth transistor controlled by the third gate-on voltage supplied through the third power line, and configured to connect a second power line supplied with a second gate-on voltage to the second node, and fifth, sixth, and seventh transistors connected in series between the second node and the fifth power line supplied with the second gate-off voltage, and controlled by the clock signal, the block signal, and the group signal.

The second controller according to some embodiments can output the second gate-off voltage to the second node through the fifth to seventh transistors when the block signal and the group signal are in the gate-on level. The second controller according to some embodiments can output the second gate-on voltage to the second node through the fourth transistor when at least one of the clock signal, the block signal, and the group signal is in the gate-off level. The second gate-off voltage is lower than the first gate-off voltage, and the second gate-on voltage is higher than the first gate-on voltage, and is lower than the third gate-on voltage.

The plurality of stages according to some embodiments can include 'n' (=x×y×z) stages by including 'z' groups to which the 'z' (z is an integer of 2 or more) group signals are individually supplied, and each of the 'z' groups can include 'y' blocks to which the 'y' (y is an integer of 2 or more) block signals are individually supplied, and each of the 'y' blocks includes 'x' stages to which the 'x' (x is an integer of 2 or more) clock signals are individually supplied.

Each of the 'x' clock signals according to some embodiments can have a first section including a gate-on level part of a first period and a gate-off level part of a second period, and the gate-on-level part of the first period is phase-delayed and supplied in sequence. Each of the 'y' block signals according to some embodiments can have a second section including a gate-on level part of a third period and a gate-off level part of a fourth period, the gate-on-level part of the third period is phase-delayed and supplied in sequence, and the third period is set to be longer than time overlapping the first periods of the 'x' clock signals. Each of the 'z' group signals according to some embodiments can have a third section including a gate-on level part of a fifth period and a gate-off level part of a sixth period, the gate-on level part of the fifth period is phase-delayed and supplied in sequence, and the fifth period is set to be longer than time overlapping the third periods of the 'y' block signals.

In addition to the above-mentioned advantageous effects of the present disclosure, other features and advantages of the present disclosure will be clearly understood by those skilled in the art from the above description or explanation. Furthermore, features, structures, effects and so on exemplified in at least one example of the present disclosure can be implemented by combining or modifying other examples by a person having ordinary skilled in this field. Therefore, contents related to such combinations and modifications should be interpreted as being included in the scope of the present application.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

What is claimed is:

1. A gate driver comprising:

a plurality of stages configured to individually drive a plurality of gate lines by a combination of a plurality of group signals, a plurality of block signals, and a plurality of clock signals, wherein each of the plurality of stages driven independently includes:

an output buffer including a pull-up transistor configured to generate and output a gate-on level of a scan signal under control of a first node, and a pull-down transistor configured to generate and output a gate-off level of the scan signal under control of a second node;

a first controller configured to control the first node by the combination of the group signal supplied through a group line among the plurality of group signals, the block signal supplied through a block line among the plurality of block signals, and the clock signal supplied through a clock line among the plurality of clock signals; and a second controller configured to control the second node to be opposite to an operation of the first node by the combination of the group signal, the block signal, and the clock signal, wherein:

the plurality of stages include 'n' stages by including 'z' groups to which the 'z' group signals are individually supplied, where n=x×y×z, and z is an integer of 2 or more, each of the 'z' groups includes 'y' blocks to which the 'y' block signals are individually supplied, where y is an integer of 2 or more, and each of the 'y' blocks includes 'x' stages to which the 'x' clock signals are individually supplied, where x is an integer of 2 or more.

2. The gate driver according to claim 1, wherein:

the first controller turns-on the pull-up transistor by activating the first node when all the clock signal, the block signal, and the group signal are in the gate-on level, and the first controller turns-off the pull-up transistor by deactivating the first node when at least any one of the clock signal, the block signal, and the group signal is in the gate-off level.

3. The gate driver according to claim 1, wherein:

the second controller turns-off the pull-down transistor by deactivating the second node when all the clock signal, the block signal, and the group signal are in the gate-on level, and the second controller turns-on the pull-down transistor by activating the second node when at least any one of the clock signal, the block signal, and the group signal is in the gate-off level.

4. The gate driver according to claim 1, wherein:

the pull-up transistor outputs a first gate-on voltage, supplied through a first power line, to the gate-on level of the scan signal when the pull-up transistor is turned-on by the first controller, and the pull-down transistor outputs a first gate-off voltage, supplied through a fourth power line, to the gate-off level of the scan signal when the pull-down transistor is turned-on by the second controller.

5. The gate driver according to claim 1, wherein the first controller includes:

a first transistor controlled by the block signal and configured to output the clock signal;

a second transistor controlled by the group signal and configured to connect the first transistor to the first node; and a third transistor controlled by a third gate-on voltage supplied through a third power line, and configured to connect a fifth power line supplied with a second gate-off voltage to the first node.

6. The gate driver according to claim 5, wherein:

the first controller outputs the clock signal to the first node through the first and second transistors when the block signal and the group signal are in the gate-on level, and the first controller outputs the second gate-off voltage to the first node through the third transistor when at least one of the clock signal, the block signal, and the group signal is in the gate-off level.

7. The gate driver according to claim 1, wherein the second controller includes:

a fourth transistor controlled by a third gate-on voltage supplied through a third power line, and configured to connect a second power line supplied with a second gate-on voltage to the second node; and fifth, sixth, and seventh transistors connected in series between the second node and a fifth power line supplied with a second gate-off voltage, and controlled by the clock signal, the block signal, and the group signal, wherein:

the fifth transistor is controlled by the clock signal and configured to connect the second node to the sixth transistor, the sixth transistor is controlled by the block signal and configured to connect the fifth transistor to the seventh transistor, and the seventh transistor is controlled by the group signal and configured to connect the sixth transistor to the second gate-off voltage of the fifth power line.

8. The gate driver according to claim 7, wherein:

the second controller outputs the second gate-off voltage to the second node through the fifth to seventh transistors when the block signal and the group signal are in the gate-on level, and the second controller outputs the second gate-on voltage to the second node through the fourth transistor when at least one of the clock signal, the block signal, and the group signal is in the gate-off level.

9. The gate driver according to claim 8, wherein:

the second gate-off voltage is lower than a first gate-off voltage output by the pull-down transistor, and the second gate-on voltage is higher than the first gate-on voltage, and is lower than the third gate-on voltage.

10. The gate driver according to claim 1, wherein:

each of the 'x' clock signals has a first section including a gate-on level part of a first period and a gate-off level part of a second period, and the gate-on-level part of the first period is phase-delayed and supplied in sequence, each of the 'y' block signals has a second section including a gate-on level part of a third period and a gate-off level part of a fourth period, the gate-on-level part of the third period is phase-delayed and supplied in sequence, and the third period is set to be longer than time overlapping the first periods of the 'x' clock signals, and each of the 'z' group signals has a third section including a gate-on level part of a fifth period and a gate-off level part of a sixth period, the gate-on level part of the fifth period is phase-delayed and supplied in sequence, and the fifth period is set to be longer than time overlapping the third periods of the 'y' block signals.

11. The gate driver according to claim 10, wherein:

the second period is set to be longer than the first period, the fourth period is set to be longer than the third period, and the sixth period is set to be longer than the fifth period.

12. A display device comprising:

a display panel; and a gate driver disposed in the display panel, wherein the gate driver comprises:

a plurality of stages configured to individually drive a plurality of gate lines by a combination of a plurality of group signals, a plurality of block signals, and a plurality of clock signals, wherein each of the plurality of stages driven independently includes:

an output buffer including a pull-up transistor configured to generate and output a gate-on level of a scan signal under control of a first node, and a pull-down transistor configured to generate and output a gate-off level of the scan signal under control of a second node;

a first controller configured to control the first node by the combination of the group signal supplied through a group line among the plurality of group signals, the block signal supplied through a block line among the plurality of block signals, and the clock signal supplied through a clock line among the plurality of clock signals; and a second controller configured to control the second node to be opposite to an operation of the first node by the combination of the group signal, the block signal, and the clock signal, wherein:

the plurality of stages include 'n' stages by including 'z' groups to which the 'z' group signals are individually supplied, where $n=x\times y\times z$, and z is an integer of 2 or more, each of the 'z' groups includes 'y' blocks to which the 'y' block signals are individually supplied, where y is an integer of 2 or more, and each of the 'y' blocks includes 'x' stages to which 'x' clock signals are individually supplied, where x is an integer of 2 or more.

13. The display device according to claim 12, wherein:

the first controller turns-on the pull-up transistor by activating the first node when all the clock signal, the block signal, and the group signal are in the gate-on level, the first controller turns-off the pull-up transistor by deactivating the first node when at least any one of the clock signal, the block signal, and the group signal is in the gate-off level, the second controller turns-off the pull-down transistor by deactivating the second node when all the clock signal, the block signal, and the group signal are in the gate-on level, and the second controller turns-on the pull-down transistor by activating the second node when at least any one of the clock signal, the block signal, and the group signal is in the gate-off level.

14. The display device according to claim 12, wherein:

the pull-up transistor outputs a first gate-on voltage, supplied through a first power line, to the gate-on level of the scan signal when the pull-up transistor is turned-on by the first controller, and the pull-down transistor outputs a first gate-off voltage, supplied through a fourth power line, to the gate-off level of the scan signal when the pull-down transistor is turned-on by the second controller.

15. The display device according to claim 12, wherein the first controller includes:

a first transistor controlled by the block signal and configured to output the clock signal;

a second transistor controlled by the group signal and configured to connect the first transistor to the first node; and a third transistor controlled by a third gate-on voltage supplied through a third power line, and configured to connect a fifth power line supplied with a second gate-off voltage to the first node, wherein:

the first controller outputs the clock signal to the first node through the first and second transistors when the block signal and the group signal are in the gate-on level, and the first controller outputs the second gate-off voltage to the first node through the third transistor when at least one of the clock signal, the block signal, and the group signal is in the gate-off level.

16. The display device according to claim 12, wherein the second controller includes:

a fourth transistor controlled by a third gate-on voltage supplied through a third power line, and configured to connect a second power line supplied with a second gate-on voltage to the second node; and fifth, sixth, and seventh transistors connected in series between the second node and a fifth power line supplied with a second gate-off voltage, and controlled by the clock signal, the block signal, and the group signal, wherein:

the fifth transistor is controlled by the clock signal and configured to connect the second node to the sixth transistor, the sixth transistor is controlled by the block signal and configured to connect the fifth transistor to the seventh transistor, and the seventh transistor is controlled by the group signal and configured to connect the sixth transistor to the second gate-off voltage of the fifth power line.

17. The display device according to claim 16, wherein:

the second controller outputs the second gate-off voltage to the second node through the fifth to seventh transistors when the block signal and the group signal are in the gate-on level, the second controller outputs the second gate-on voltage to the second node through the fourth transistor when at least one of the clock signal, the block signal, and the group signal is in the gate-off level, the second gate-off voltage is lower than a first gate-off voltage output by the pull-down transistor, and the second gate-on voltage is higher than the first gate-on voltage, and is lower than the third gate-on voltage.

18. The display device according to claim 12, wherein:

each of the 'x' clock signals has a first section including a gate-on level part of a first period and a gate-off level part of a second period, and the gate-on-level part of the first period is phase-delayed and supplied in sequence, each of the 'y' block signals has a second section including a gate-on level part of a third period and a gate-off level part of a fourth period, the gate-on-level part of the third period is phase-delayed and supplied in sequence, and the third period is set to be longer than time overlapping the first periods of the 'x' clock signals, and each of the 'z' group signals has a third section including a gate-on level part of a fifth period and a gate-off level part of a sixth period, the gate-on level part of the fifth period is phase-delayed and supplied in sequence, and the fifth period is set to be longer than time overlapping the third periods of the 'y' block signals.

19. The display device according to claim 18, wherein:

the second period is set to be longer than the first period, the fourth period is set to be longer than the third period, and the sixth period is set to be longer than the fifth period.

20. A display device comprising:

a display panel; and a gate driver embedded in the display panel, wherein the gate driver comprises:

a plurality of stages configured to individually drive a plurality of gate lines by a combination of a plurality of group signals, a plurality of block signals, and a plurality of clock signals, wherein each of the plurality of stages driven independently includes:

an output buffer including a pull-up transistor configured to generate and output a gate-on level of a scan signal under control of a first node, and a pull-down transistor configured to generate and output a gate-off level of the scan signal under control of a second node;

a first controller configured to control the first node by the combination of the group signal supplied through a group line among the plurality of group signals, the block signal supplied through a block line among the plurality of block signals, and the clock signal supplied through a clock line among the plurality of clock signals; and a second controller configured to control the second node to be opposite to an operation of the first node by the combination of the group signal, the block signal, and the clock signal, wherein the first controller includes:

a first transistor controlled by the block signal and configured to output the clock signal;

a second transistor controlled by the group signal and configured to connect the first transistor to the first node; and a third transistor controlled by a third gate-on voltage supplied through a third power line, and configured to connect a fifth power line supplied with a second gate-off voltage to the first node, wherein:

the first controller outputs the clock signal to the first node through the first and second transistors when the block signal and the group signal are in the gate-on level, and the first controller outputs the second gate-off voltage to the first node through the third transistor when at least one of the clock signal, the block signal, and the group signal is in the gate-off level.

* * * * *